United States Patent [19]
Heim et al.

[11] Patent Number: 6,102,470
[45] Date of Patent: Aug. 15, 2000

[54] MOTOR VEHICLE BODY CONSISTING OF A SHELL BODY AND A CLOSING MODULE, CLOSING MODULE FOR A MOTOR VEHICLE BODY AND PROCESS FOR MOUNTING A CLOSING MODULE ON A SHELL BODY

[75] Inventors: Gunther Heim, Rodgau; Joachim Janz, Stammham; Armin Klein, Westerngrund, all of Germany

[73] Assignee: Wagon Automotive GmbH, Waldaschaff, Germany

[21] Appl. No.: 09/276,753

[22] Filed: Mar. 26, 1999

[30] Foreign Application Priority Data

Mar. 26, 1998 [DE] Germany .............. 198 13 393

[51] Int. Cl.$^7$ .................................................. B60R 19/04
[52] U.S. Cl. .............................. 296/188; 293/133; 296/56
[58] Field of Search .................................... 296/50, 51, 52, 296/55, 56, 59, 60, 146.11, 202, 218, 216.02, 188; 293/131, 132, 133

[56] References Cited

U.S. PATENT DOCUMENTS

| 4,413,856 | 11/1983 | McMahan et al. | .......... 296/188 |
| 5,772,267 | 6/1998 | Heim et al. | .......... 293/133 |

FOREIGN PATENT DOCUMENTS

| 0 180 554 | 5/1986 | European Pat. Off. . |
| 0 556 472 | 8/1993 | European Pat. Off. . |
| 2548-600 | 1/1985 | France ................................ 296/50 |
| 44 13 970 | 9/1995 | Germany . |
| 197 02 543 | 8/1997 | Germany . |

*Primary Examiner*—D. Glenn Dayoan
*Attorney, Agent, or Firm*—Nixon Peabody LLP; David S. Safran

[57] ABSTRACT

A motor vehicle shell with a shell body with a body cutout for a hatch or door, especially for a rear hatch (3), and with a completely pre-mountable closing module (6) with a rim (7). The module bearing the hatch or door, especially therefore the rear hatch (3) and the associated assemblies, and for closing the body cutout of the shell body, the shell body and the rim (7) of the closing module (6) has bearing surfaces (9) which engage each other, and which extend roughly parallel to the main plane of the closing module (6). The rim (7) of the closing module (6) is attached to the shell body, with several fastening screws (10) or other mechanical attachment elements. This motor vehicle body is characterized in that the rim (7) of the closing module (6) has attachment surfaces (15) which extend roughly perpendicularly to its bearing surfaces (9) and which overlap the corresponding attachment surfaces (15) on the shell body and that the fastening screws (10) are located on these attachment surfaces (15) and join the two elements on the attachment surfaces (15) to one another.

23 Claims, 8 Drawing Sheets

MOTOR VEHICLE BODY CONSISTING OF A SHELL BODY AND A CLOSING MODULE, CLOSING MODULE FOR A MOTOR VEHICLE BODY AND PROCESS FOR MOUNTING A CLOSING MODULE ON A SHELL BODY

BACKGROUND OF THE INVENTION

1. Field of the Invention

The invention relates to a motor vehicle body with a shell body and a closing module, with a body cutout for a hatch or door, especially for a rear hatch, and with a completely pre-mountable closing module with a rim, the module bearing the hatch or door, and the pertinent assemblies, and closing the body cutout of the shell body, the shell body and the rim of the closing module having bearing surfaces or bearing moldings, which are assigned to one another, which adjoin one another optionally with inclusion of adhesive for permanently adhesive connection and which extend roughly parallel to the main plane of the closing module and the rim of the closing module being attached to the shell body with several fastening screws or other mechanical attachment elements. The invention also relates to a closing module for this motor vehicle body and a process for mounting a closing module on a shell body of a motor vehicle body.

2. Description of Related Art

In motor vehicle bodies known in general from practice, the body opening is reinforced by a frame structure and the hatch or door is connected to the frame to swing directly via hinges. In the area of the body cutouts and the hatches and doors, there are assemblies and inlet lines which can be installed in the conventional structure throughout only in the course of final installation. This is especially important for the rear hatch of a motor vehicle body.

The above described problem has been recognized and has undergone improvement; the invention proceeds from one such motor vehicle body (published German Patent Application No. DE-A-197 02 543). This motor vehicle body is characterized by the fact that a closing module is attached to the body cutout which closes this cutout and which, for its part, has a peripheral rim and can be completely preassembled with all pertinent assemblies. This is designed to enable economical pre-assembly with a high degree of integration and to relieve the final mounting belt which is especially sensitive to disruptions.

In the known motor vehicle body which is mentioned above and from which the invention proceeds, the closing module is the rear hatch module in the example explained there and extends over the entire motor vehicle rear. The closing module is placed and attached there by means of bearing surfaces, and the bearing surfaces can be made flat or profiled with retaining flanges. In this case, the rim of the closing module is permanently adhesively joined to the shell body by means of the bearing surfaces with the inclusion of adhesive. The cementing is used not only for a permanent adhesive connection, but especially also for sealing. The connection is moreover completed by screwing and/or riveting, therefore by the corresponding mechanical attachment elements. The fastening screws and the corresponding insertion openings are located on the bearing surfaces which adjoin one another and which extend roughly parallel to the main plane of the closing module and run peripherally entirely externally on the shell body cutout on the edge side.

The above described attachment technology for the closing module of the known motor vehicle body requires a special configuration of the peripheral frame on the shell body cutout. In addition adjustment is possible in only two directions (y and z).

SUMMARY OF THE INVENTION

The primary object of the present invention is to embody and develop the known motor vehicle body with a shell body and a closing module for a body cutout of a hatch or door, especially a rear hatch, such that mounting on the final mounting belt can proceed more easily and more quickly with a structure of the shell body and closing module which is as simple as possible.

The above described object is achieved in a motor vehicle body in which the rim of the closing module has attachment surfaces which extend roughly perpendicularly to its bearing surfaces and which overlap corresponding attachment surfaces on the shell body, and where the fastening screws are located on these attachment surfaces and join the two elements to one another on the attachment surfaces. This object can also be achieved subordinately in a motor vehicle body with a shell body with a body cutout for a rear hatch and with a completely pre-mountable closing module with a rim, the module bearing the rear hatch and the pertinent assemblies, and closing the body cutout of the shell body, the shell body underneath the body cutout having side members which run in the longitudinal direction, wherein a lower frame runner of the rim of the closing module runs above the side members of the shell body, wherein a preassembled collision member which includes the crash-boxes on both sides is attached to the lower frame runner of the rim, and wherein the crash-boxes are screwed (or connected in some other way) directly to the side members.

For a closing module as such, the above described object is achieved by the rim of the closing module having attachment surfaces which extend roughly perpendicularly to its bearing surfaces and which can be caused to overlap the corresponding attachment surfaces on the shell body, and wherein the attachment surfaces on the rim are provided with insertion openings for the fastening screws or the like.

Finally, an optimized sequence of process steps for achievement of the above described object results from the shell body being, for the most part, completely preassembled before mounting the closing module and being equipped especially with an inner roof lining and an inside lining, and by providing adhesive on the bearing surfaces of the closing module, placing the closing module on the body cutout of the shell body, attaching and fixing the closing module in the body cutout of the shell body with the door or hatch, especially a rear hatch, open using a few, especially six to eight, fastening screws or the like in the upper area, in the lower area and on the sides of the rim of the closing module, the fastening screws or the like being all or predominantly screwed in (or inserted in some other way) from the inside out with reference to the main plane of the closing module.

The teaching of the invention is explained below primarily with reference to the context of a rear hatch, but it can be used in principle for all body cutouts for hatches or doors. The teaching of the invention acquires special importance in the attachment of the rear hatch module to the shell body.

For the teaching of the invention, it is significant that the fastening screws and insertion openings for the fastening screws are no longer assigned to the bearing surfaces or bearing moldings (which can be largely degenerated bearing surfaces), but are assigned to the attachment surfaces which run roughly perpendicularly to the bearing surfaces and which, to date, have not been provided either structurally or in any case have not been used for attachment purposes. The different alignment of the fastening screws has major advantages for mounting technique, because, with the rear hatch open (for a rear hatch module), the fastening screws can be very easily screwed in from the inside of the body cutout to the top or bottom, to the right or to the left. Accessibility for these attachment measures is outstanding. At the same time, this results in that fixing of the closing module on the shell body, at the top and the bottom and at the sides, is done by the attachment surfaces so that the pulling forces pointed in the direction perpendicularly to the main plane of the closing module do not place the fastening screws under tension, but under shear stresses and therefore can be especially well accommodated. This leads to the fact that the adhesive can set at rest and can later accommodate the primary load. Finally, adjustment capacity is good in all three directions, i.e., the x, y, and z directions.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENT

The first embodiment of a motor vehicle body shown in FIGS. 1 to 4 relates to an arrangement of a rear hatch module that is supported on the shell body, i.e., the module encompasses or surrounds the end of the body shell and thus is supported thereon. It remains to be emphasized here that this is one preferred embodiment for the teaching of the invention which, however, can be accomplished otherwise also on other body cutouts for hatches or doors.

Figure 1:
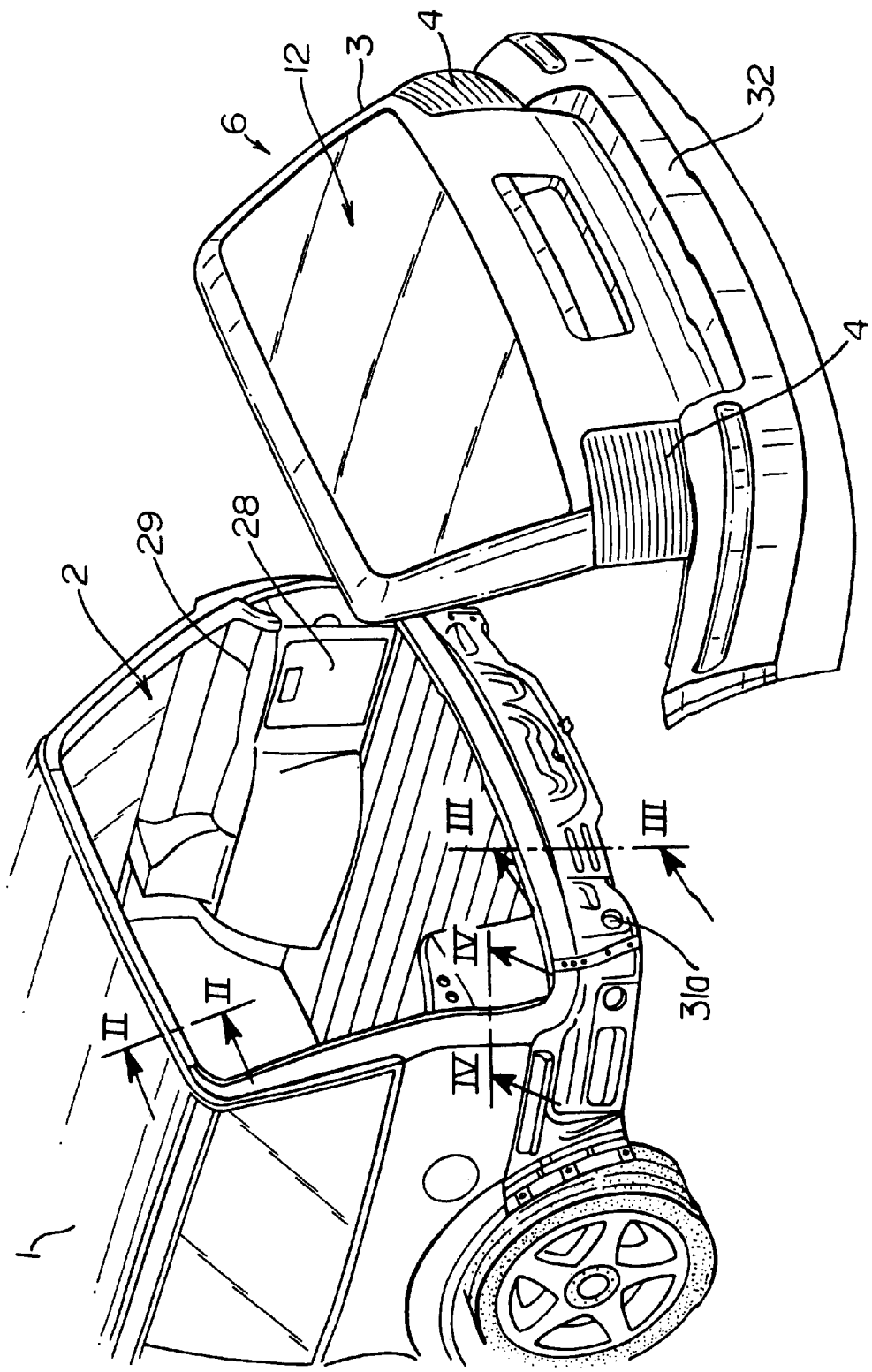
FIG. 1 is a perspective view of a preferred embodiment of a motor vehicle body with a closing module for a rear hatch prior to attachment thereof.
Figure 2:
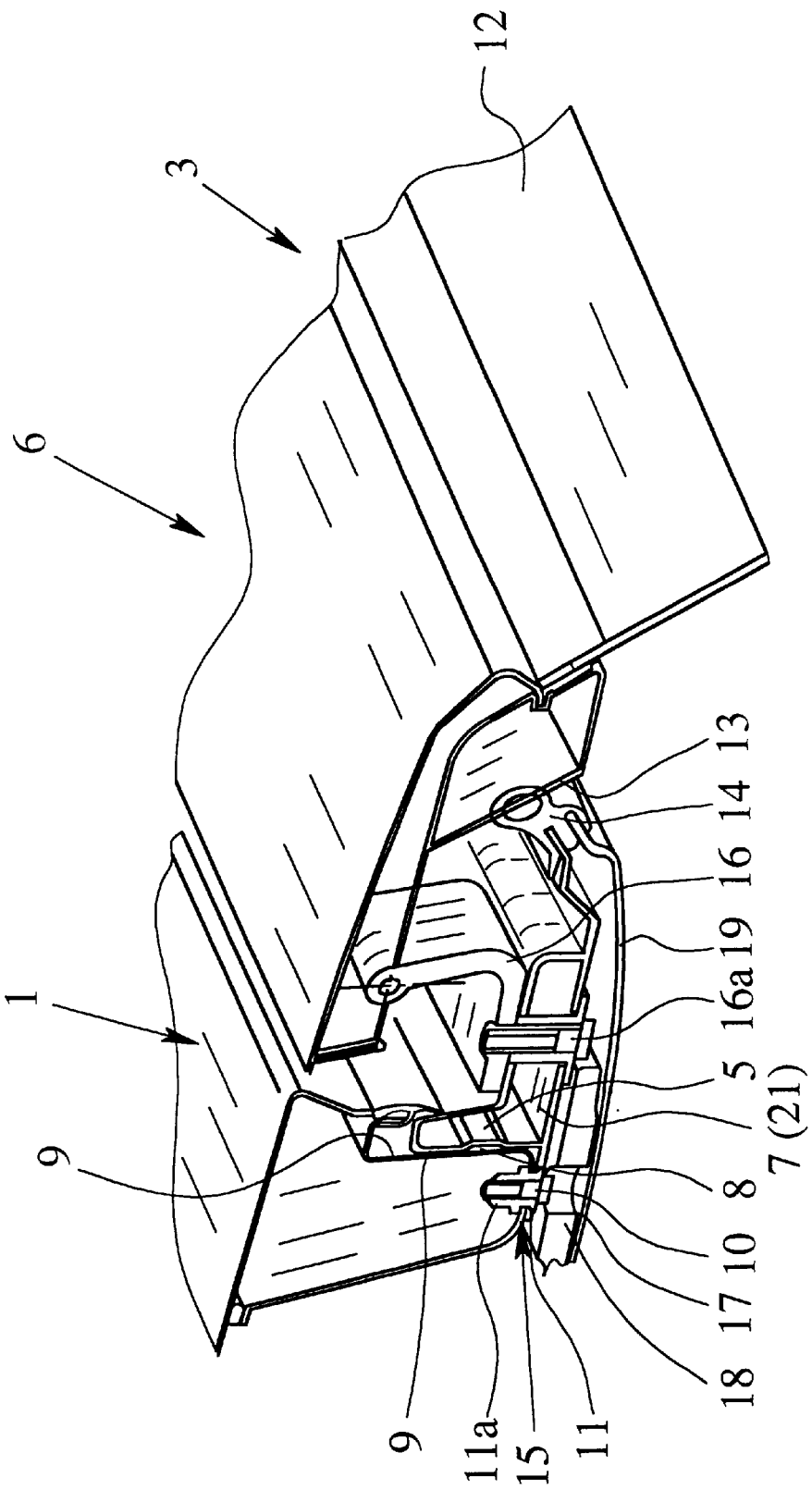
FIG. 2 is an enlarged sectional view taken along line II—II in FIG. 1, in the hinge area of the rear hatch with the closing module in place.
Figure 3:
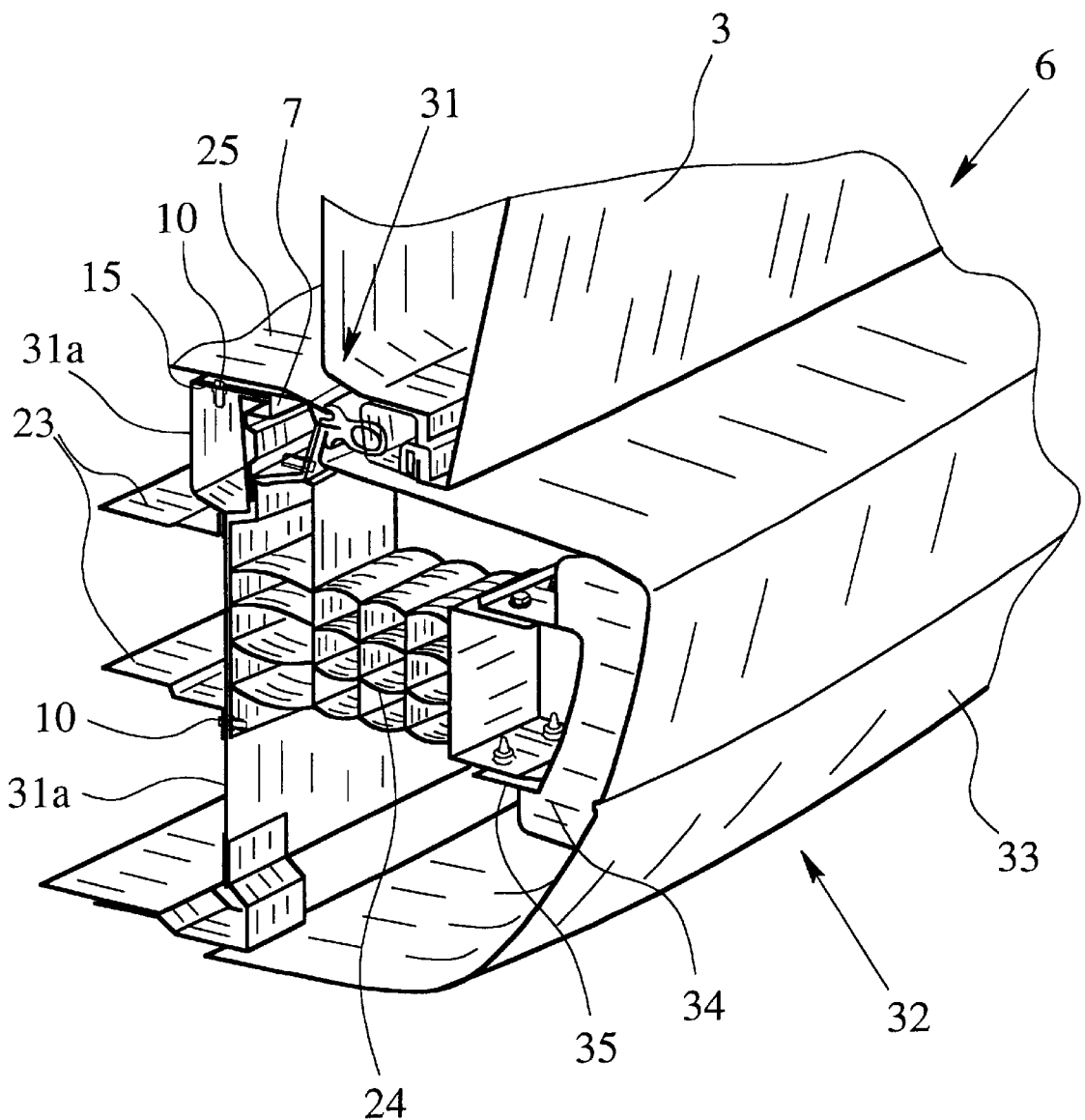
FIG. 3 is an enlarged sectional view taken along line III—III in FIG. 1, in the area of the side member of the shell body with the closing module in place.
Figure 4:
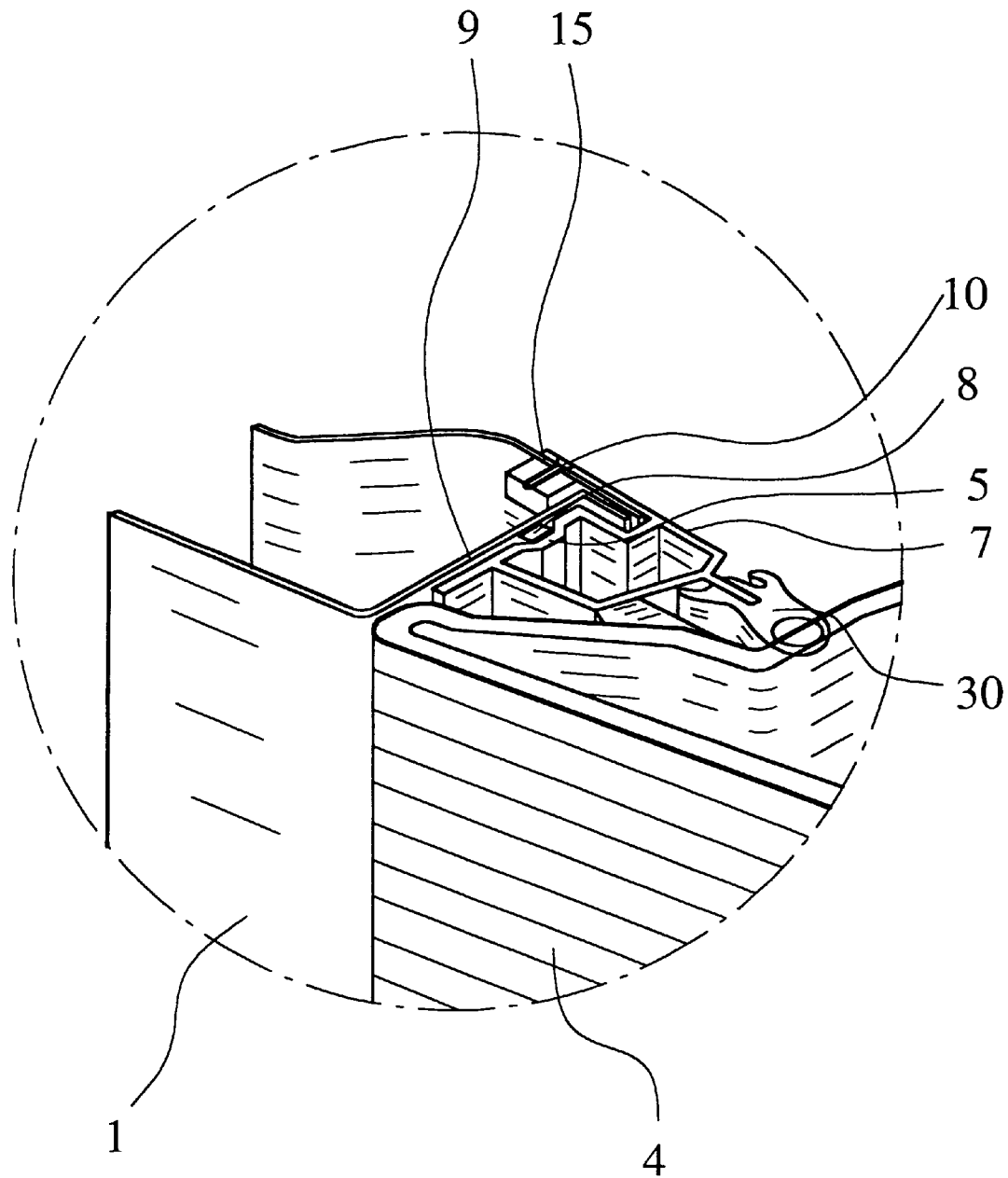
FIG. 4 is an enlarged detail of the side edge of the closing module on the shell body viewed along line IV—IV in FIG. 1.

In general, FIG. 1 shows, first of all, a motor vehicle body with a shell body 1 which is shown in FIG. 1 on the left and which forms a body cutout 2 for a hatch or a door which, in the embodiment shown, is a rear hatch 3. Adjacent to the rear hatch 3 are conventional rear lamp units 4. A closing module 6 which carries the hatch or door, here the rear hatch 3, and the pertinent assemblies, closes the body cutout 2 of the shell body 1. This module, itself, has a rim 7 which is not recognizable in FIG. 1, but is shown in FIGS. 2, 3 and 4.

The closing module 6 can largely be completely preassembled and is then joined and attached as a preassembled unit on the final mounting belt to the painted shell body 1. The teaching of this invention addresses construction features which are important for this attachment and the attachment process.

First of all, it is such that the shell body 1 and the rim 7 of the closing module 6 have bearing surfaces 9 or bearing moldings which adjoin one another with inclusion of adhesive 8 for permanently adhesive connection and sealing and which extend roughly parallel to the main plane of the closing module 6. It depends on the construction in particular whether the adhesive 8 is used primarily for adhesive connection or primarily for sealing or whether there is no adhesive 8 at all, but only sealing means which can then be made as rubber seals.

The adjoining bearing surfaces 9 or bearing moldings of the shell body 1 and the closing module 6 are used for definition of the attachment position of the closing module 6 to the shell body 1.

The rim 7 of the closing module 6 is attached to the shell body 1 with several fastening screws 10 or other mechanical attachment elements, for example, fastening rivets, as will be explained later in particular using FIGS. 2, 3 and 4 for the embodiment from FIG. 1. Therefore, this concept, just like the concepts "screw" or "screw in", should always be understood in a general sense. Of course, the appropriate insertion openings 11 correspond to the fastening screws 10 in the pertinent component.

The teaching of the invention will now be explained in particular using FIGS. 2, 3 and 4, first FIG. 2, for the supported version.

FIG. 2, left, shows first of all the shell body 1 with the corresponding bearing surface 9, and on the right, the closing module 6 with the rim 7 with the corresponding bearing surface 9 in which there is a bead 5 for holding the adhesive 8. In the closing module 6, on the right is the frame of the rear hatch 3 with the rear window 12 and a seal bearing surface 13 for a peripheral hatch seal 14.

At this point, it is significant first of all that the rim 7 of the closing module 6 has attachment surfaces 15 which extend roughly perpendicularly to its bearing surfaces 9 and which overlap corresponding attachment surfaces 15 on the shell body 1 and that the fastening screws 10 (or other mechanical fastening elements) are located on these attachment surfaces 15 and join the two body parts to one another. FIGS. 2, 3 and 4 show that the respective fastening screws 10 are screwed from the inside of the body cutout 2 to the outside, into the corresponding threaded connection pieces 11a on the shell body 1, which with the closing module 6 attached, are flush with the insertion openings 11 on the attachment surfaces 15 on the closing module 6. Instead of threaded connection pieces, all type of receivers are considered, therefore, for example, rivet nuts, punched nuts, etc.

The section shown in FIG. 2 shows that, in the upper area of the closing module 6 to the right and left, at least one fastening screw 10 is screwed in from the inside out. In this embodiment, this takes place in the area of a hatch hinge 16, the latter itself being fixed by a hinge fastening screw 16a on the rim 7.

One important advantage of the teaching of the invention is that the shell body 1 can be for the most part preassembled. This follows from FIG. 2 such that the fastening screws 10 are screwed in through openings 17 in an already mounted inside roof lining 18 on the shell body 1. It is apparent that these openings 17 in the inside roof lining 18 have then been covered by a screen 19 which finally ends in this embodiment again on the edge in the hatch seal 14.

Figure 5:
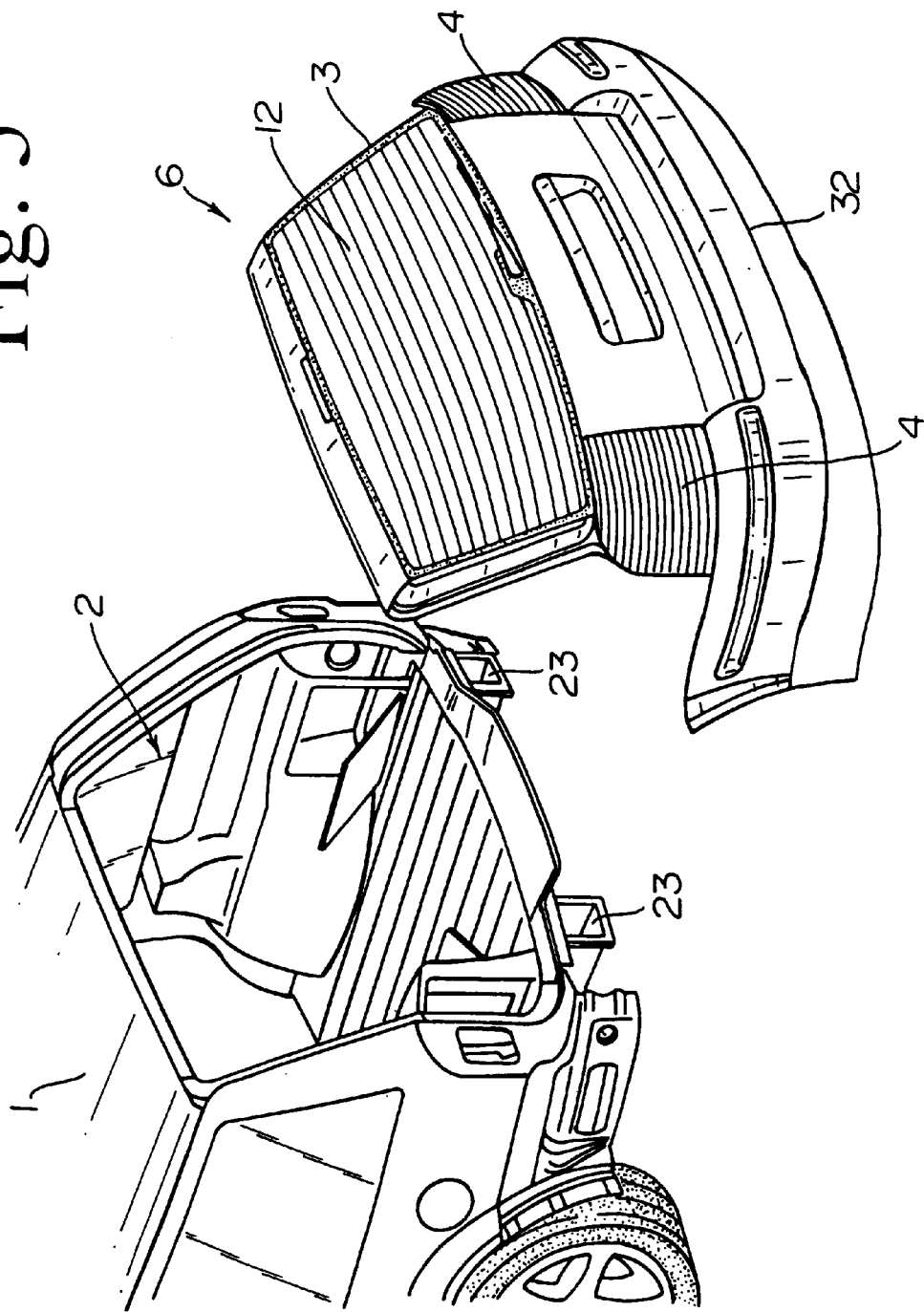
FIG. 5 is a perspective view similar to that of FIG. 1, but of another embodiment of the invention in which the enclosed rear hatch will be laterally surrounded by the shell body.
Figure 6:
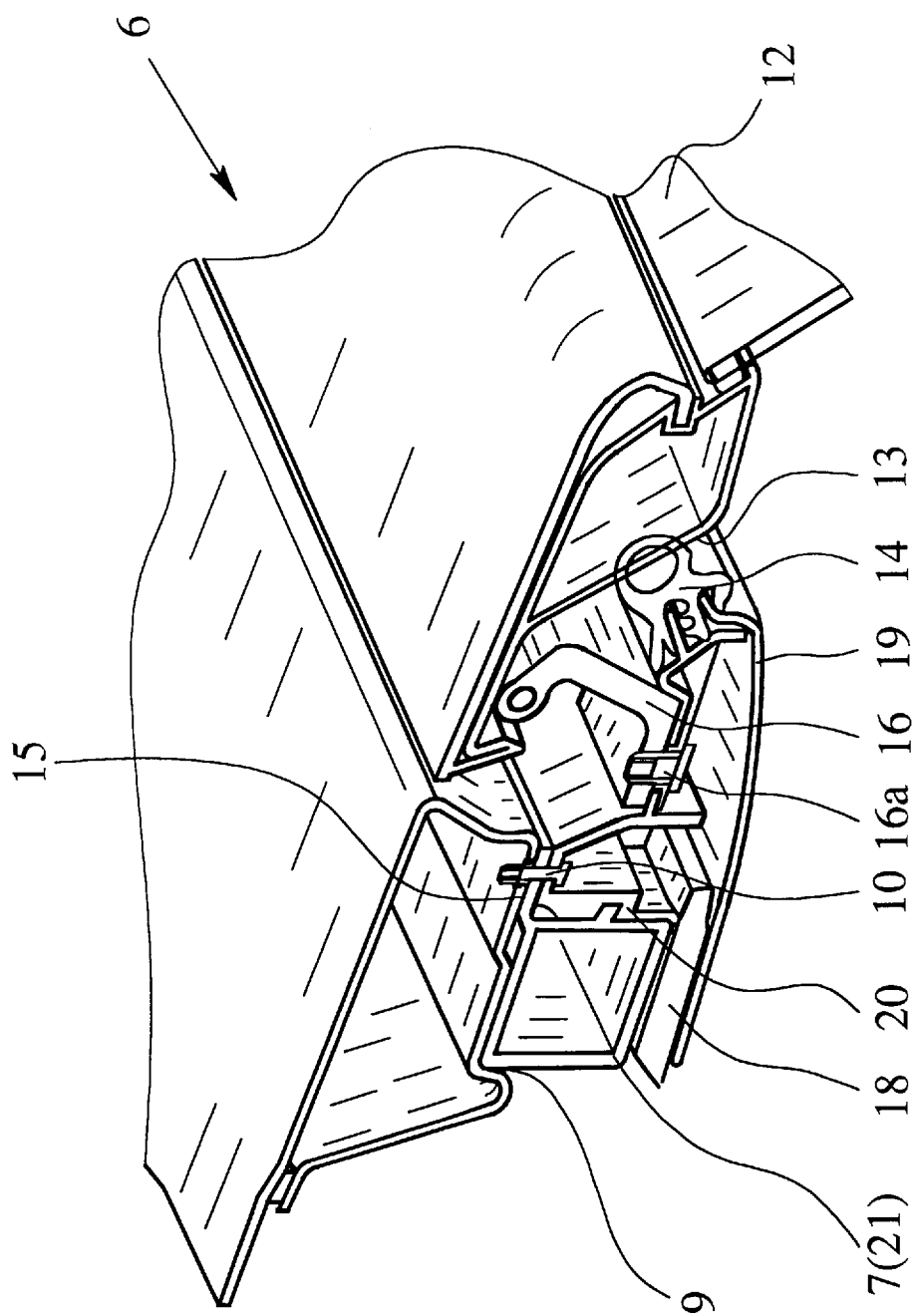
FIG. 6 is a sectional view corresponding to that of FIG. 2, but showing a section of the embodiment of FIG. 5.

FIGS. 5 to 8 show, as explained initially, another embodiment of a shell body in which the rear hatch 3 is not supported, but is peripherally enclosed by the shell body, i.e., it is made to be bounded by the side runners of the shell body 1. FIG. 6 shows a representation that corresponds to that of FIG. 2. Here, it can be recognized that the fastening screws 10 are positioned in the reinforcements 20 which carry the hatch hinges 16 (water drain channel). Here, it is also otherwise apparent that the bearing surfaces 9 degenerate at the top into bearing moldings which form a stop for the rim 7 of the closing module 6.

The reinforcements 20 here are formed by a casting or the like (additional sheet metal part, forged part, etc.) attached to the upper frame runner 21 of the rim 7.

Figure 7:
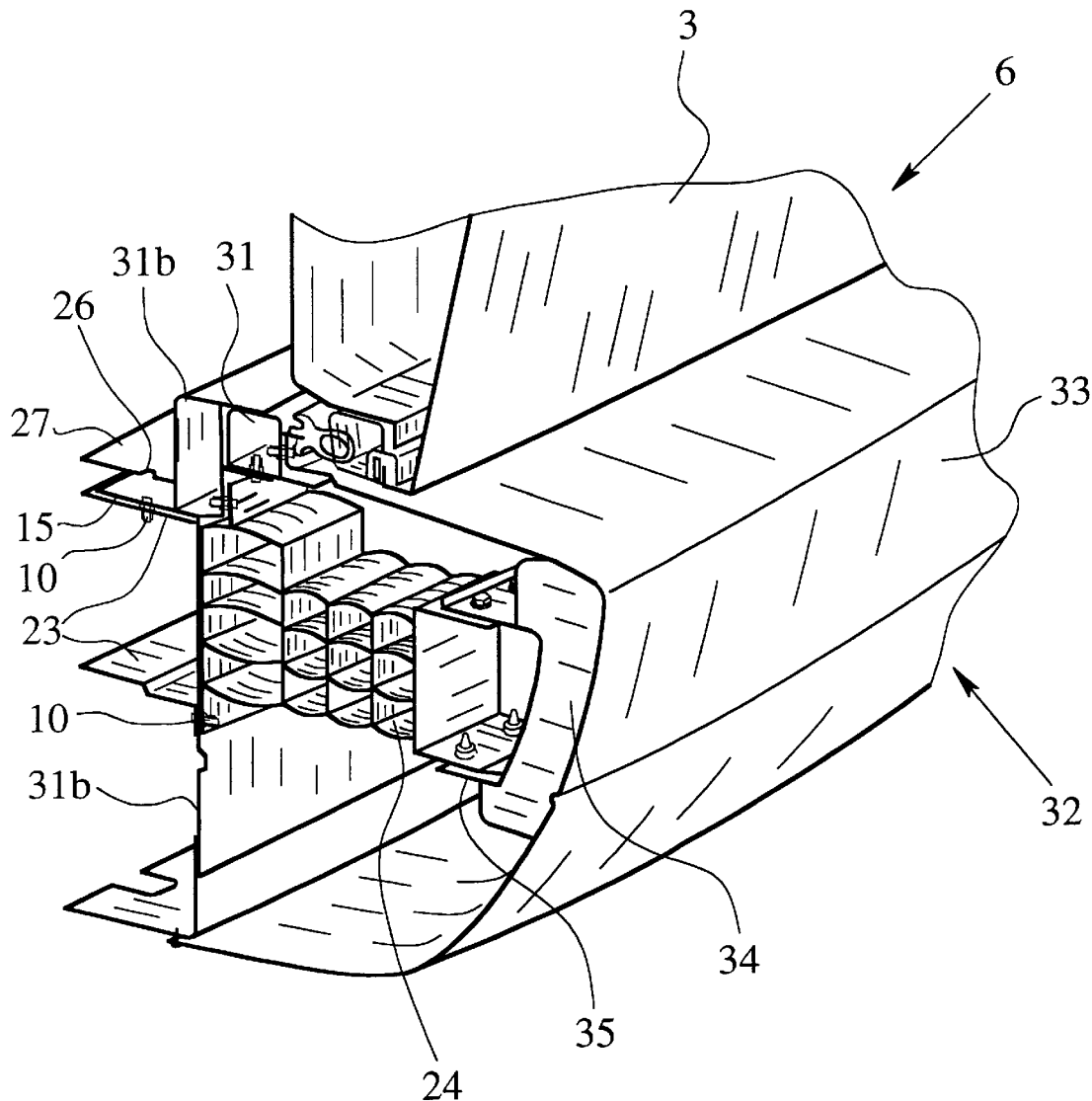
FIG. 7 is a sectional view corresponding to that of FIG. 3, but showing a section of the embodiment of FIG. 5.

Based on FIG. 3 for the first embodiment (supported) and FIG. 7 for the second embodiment (enclosed) we will now turn to the attachment of the closing module 6 to the shell body 1 in the lower area. There, likewise to the right and left, at least one fastening screw 10 is screwed in from the inside to the outside. In both cases, it holds that, here, the fastening screws 10 are screwed in the area above a side member 23 of the shell body 1 or a crash-box 24 of the closing module 6 (FIG. 5 clearly shows the location of the side member 23 on the shell body 1 due to the type of representation). The fastening screws 10 can be covered underneath by a rear closing rail 25 as is shown in FIG. 3. The rear closing rail 25 again ends in the hatch seal 14.

FIG. 7 illustrates another configuration in the enclosed version shown there. The is fastening screws 10 are screwed through openings 26 in a transverse flange 27 of the shell body 1 into the side member 23.

In addition to attachment at the top and bottom to the body cutout 2, there is also a screw attachment in the side area of the closing module 6 on the right and left, again with at least one fastening screw 19 which is screwed in from the inside out. FIG. 4 shows this in the area of the rear lamp unit 4 which can be seen on the left in FIG. 1. Here, the fastening screw 10 can be screwed in the already mounted inside lining 29 of the shell body through an opening which can be closed in this embodiment by a flap 28.

Figure 8:
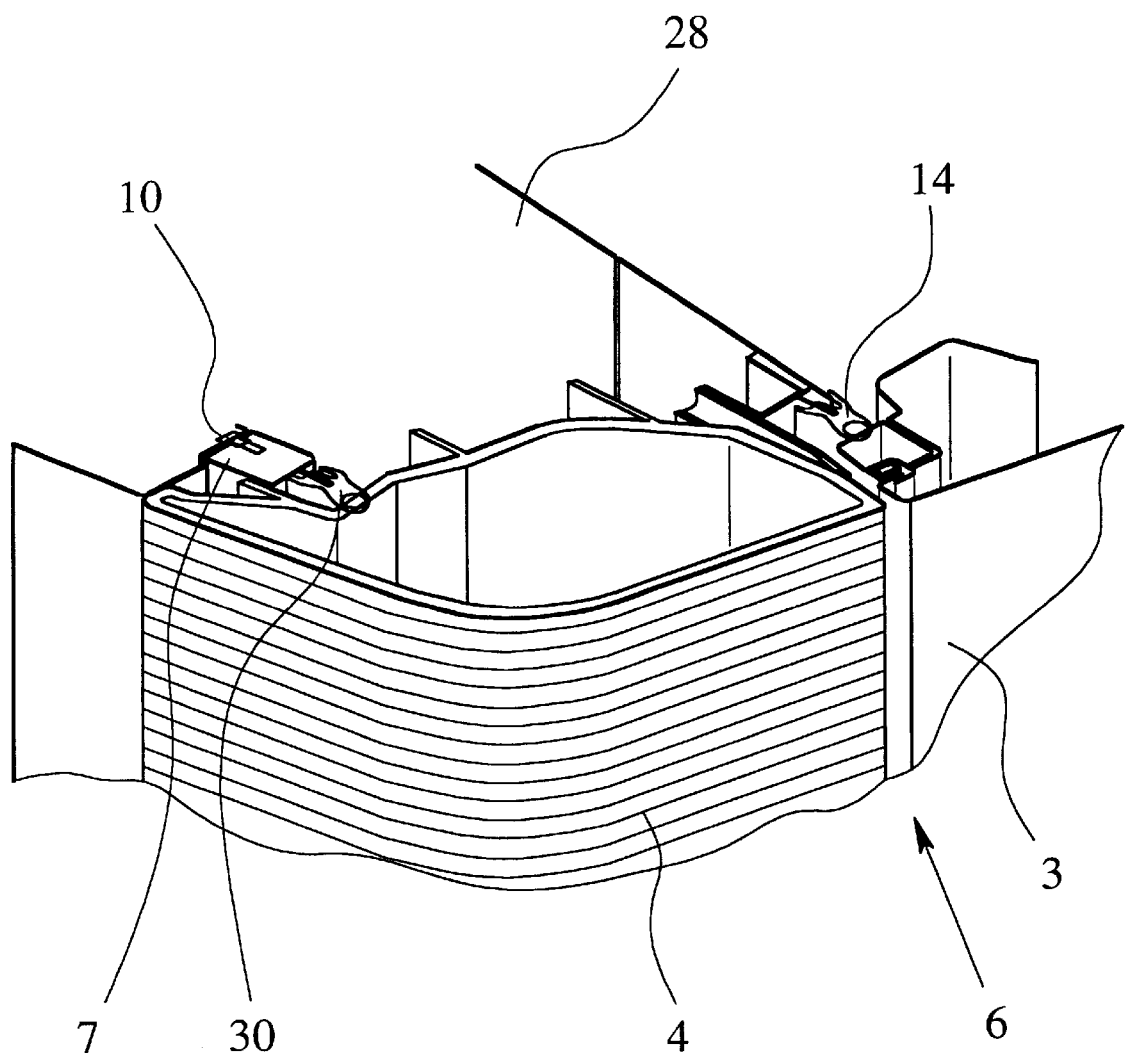
FIG. 8 is a sectional view corresponding to that of FIG. 4, but showing a section of the embodiment of FIG. 5.

As FIG. 8 clearly shows, at this point, the second embodiment as shown in FIGS. 5–8 differs from the first embodiment in FIGS. 1–4 with respect to the alignment of the fastening screws 10. Here, it is specifically such that the opening in the inside lining 29 which can be closed by the flap 28 makes the fastening screws 10 for the bearing surfaces 9 accessible, and they are screwed into the rim 7 of the closing module 6 in the longitudinal direction of the shell body 1.

FIG. 5 shows a special configuration which acquires independent inventive importance for itself. FIGS. 3 and 7 illustrate how the this embodiment differs in form from the first embodiment. That is, in FIG. 5, the shell body 1 ends above the side member 23 so that the ends of the latter are exposed.

With respect to the closing module 6, it holds that a lower frame runner 31 of the rim 7 of the closing module 6 runs above the side members 23 of the shell body 1, that a preassembled collision member 32 which includes the crash-boxes 24 on both sides is attached to the lower frame runner 31 of the rim 7 and that the crash-boxes 24 are screwed directly to the side members 23. In both embodiments the collision member 32, as is known, consists of an outer plastic bumper 33, an energy absorber 34, which accommodates smaller impacts with back deformation, a metallic bumper transverse member 35 and the two aforementioned crash-boxes 24 which establish the connection of the transverse member of the bumper 35 to the faces of the side members 23 of the shell body 1.

In the first embodiment shown in FIG. 3 (supported), a rear closure-reinforcing sheet 31 a is attached to the shell body 1 underneath the body cutout 2 and overlaps the ends of the side members 23. In this case, the crash-boxes 24 are screwed to the side members 23 with interposition of the rear closure-reinforcing sheet 31 a of the shell body 1. The rim 7 with the lower frame runner 31 itself however lies above the ends of the side members 23.

In the second embodiment shown in FIG. 7, the enclosed version, which is also shown in FIG. 5, it is provided that a rear closure section 31b which is extended downward is attached on the lower frame runner 31 of the rim 7. Here, the crash-boxes 24 are screwed to the side members 23 with the interposition of this rear closure section 31b. But here, the rim 7, itself, runs and ends above the crash boxes.

It is important for optimized assembly that the unit which forms the collision member 32 is fully preassembled on the closing module 6, but to a certain extent hangs under the other closing module 6 on the rim 7 and itself is attached essentially directly to the side members 23. This results not only in the collision member 32 also being prepared within the framework of preassembly with the closing module 6. It is important that preassembly is possible, but the collision member 32 is preserved as an independent assembly which is directly connected to the shell body 1, specifically to its side members 23. This keeps the rim 7 of the closing module 6, during smaller collisions, outside of the danger area or outside of the area in which damage occurs. This in turn makes repair economical and time-saving.

In both embodiments, therefore in FIG. 3 and FIG. 7, it is apparent that the fastening screws 10 for screwing the crash boxes 24 to the side members 23 of the shell body 1 are screwed in an inside to outside longitudinal direction of the shell body 1.

In the following, the mounting of the closing module 6 on the shell body 1 will be explained in summary for both embodiments shown.

In the version of the first embodiment, FIGS. 1 to 4, the rim 7 of the closing module 6 is produced in the conventional manner, especially by stretch bending and subsequent joining to the upper frame runner 21, the upper corner elements and the hatch hinges 16. Otherwise, then preassembly of the gas pressure damper for the rear hatch 3, the hatch seal 14, a body seal 30 and the attachment of the completely preassembled rear hatch 3 to the hatch hinges 16 are performed.

In the two embodiments, the collision member 32 is attached with all parts to the rim 7 of the closing module 6.

The last preparation step is application of the adhesive 8 to the bearing surfaces 9 if an adhesive 8 is used.

In the first embodiment (supported), then the closing module 6 is moved up to the shell body 1 and is moved into the end position on the shell body 1 by means of the bearing surfaces 9 or corresponding bearing moldings. Then, with the rear hatch 3 open, the closing module 6 is attached onto the attachment surface 15 of the rim 7 from the inside using two fastening screws 10, in the area of the hatch hinges 16, through openings 17 in the inner roof lining 18 which has already been preassembled on the shell body 1. The fastening screws 10 in the openings 17 are then covered by the plastic screen 19.

In the lower area of the closing module 6, as the rear hatch 3 is furthermore opened, the closing module 6 is screwed in the bottom of the shell body 1 by means of fastening screws 10 on the corresponding attachment surface 15. Then, the rear closing rail 25, which covers the heads of the fastening screws 10, is put in place.

On each side, on its lower flange, the crash-box 24 is attached to the corresponding flange of the side member 23 with interposition of the rear closure-reinforcement sheet 31a with two fastening screws 10 which are screwed in the longitudinal direction of the shell body 1 opposite the closing module 6.

Finally, as shown in FIG. 4, the side fastening screws 10 are screwed in the already preassembled inside lining 29 through an opening closed by a flap 28.

In principle, assembly of the second embodiment (enclosed) takes place in the upper area in a quite similar manner, but here there is simply one reinforcement 20 on the upper frame runner 21, and the fastening screw 10 is screwed in there. In the lower area of the closing module 6, insertion of the fastening screws 10 through openings 26 in the transverse flange 27 of the shell body 1 takes place, then in threaded connecting pieces 11a which are provided directly in the side member 23.

Attachment of the crash-boxes 24 to the open ends of the side members 23 is likewise done via fastening screws 10 which are screwed in accordingly backwards. Here, the rear closing section 31b of the closing module 6 is present as an intermediate layer. Attachment of the fastening screws 10 to the sides was already discussed above in conjunction with the explanation of FIG. 8.

The major advantage of the invention is that the shell body 1 can be almost completely preassembled before mounting the closing module 6, here especially the rear hatch module. In particular, inner roof linings 19 and the inside lining 29 can already be mounted. The fastening screws 10 for attachment of the closing module 6 to the shell body 1 are easily accessible because they can be screwed in with the rear hatch opened generally transversely to the longitudinal direction of the shell body 1 (for mounting on the rear of the shell body).

In spite of advantageous mounting for the closing module 6, the crash-boxes 24 of the collision member 32 fit directly onto the side member 23 of the shell body 1 if the additional, independent teaching of the invention is implemented. This makes repair economical and time-saving, in any case in smaller collisions.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims. In this regard, while the terms door and hatch have been used separately above, for simplicity, in the claims, the only term door is used but such is intended to encompass doors in the form of hatches and not merely those closures commonly referred to as doors as opposed to hatches.

We claim:

1. Motor vehicle body with a shell body having a body cutout for a door, said body cutout enclosing an open area defining a closure plane, and with a completely pre-mountable closing module having a rim and bearing the door, the closing module having a door area which extends in a main plane which is substantially parallel to said closure plane when the closing module is mounted closing the body cutout; wherein the closing module is mounted closing the body cutout of the shell body, the shell body and the rim of the closing module having bearing surfaces which engage each other, and which extend roughly parallel to said closure plane of the body cutout and said main plane of the closing module; wherein the rim of the closing module is mechanically attached to the shell body by attachment elements; wherein the rim of the closing module has attachment surfaces which extend roughly perpendicularly with respect to said bearing surfaces and said main and closure planes, and which overlap corresponding attachment surfaces on the shell body engaged thereby; and wherein the attachment elements are located on said attachment surfaces and join the attachment surfaces to one another.

2. Motor vehicle body as claimed in claim 1, wherein the closing module has an upper area; wherein said attachment elements are screws which are screwed in a direction from an interior side of said body cutout to an exterior side of said body cutout in said upper area of the closing module.

3. Motor vehicle body as claimed in claim 2, wherein said door is a rear hatch which is connected at a top end thereof to the rim by hinges; and wherein said fastening screws are located at least in an area at which said hinges are located.

4. Motor vehicle body as claimed in claim 2, wherein the fastening screws are screwed in through openings in an already mounted inner roof lining.

5. Motor vehicle body as claimed in claim 3, wherein the fastening screws are positioned in reinforcements which carry the hatch hinges.

6. Motor vehicle body as claimed in claim 5, wherein the reinforcements are formed by a casting attached to an upper frame runner of the rim.

7. Motor vehicle body as claimed in claim 1, wherein the closing module has a lower area which is connected to the body shell by at least one fastening screw at each of left and right sides thereof, said fastening screws being screwed in a direction from an interior side of said body cutout to an exterior side of said body cutout.

8. Motor vehicle body as claimed in claim 7, wherein the fastening screws are each screwed in an area above a side member of the shell body and a crash-box of the closing module.

9. Motor vehicle body as claimed in claim 7, wherein the fastening screws are covered by a rear closing rail.

10. Motor vehicle body as claimed in claim 1, wherein the attachment members are fastening screws; and wherein the fastening screws are screwed in through openings in a transverse flange of the shell body into the side members in a direction from an interior side of said body cutout to an exterior side of said body cutout.

11. Motor vehicle body as claimed in claim 1, further comprising a cover member; wherein the attachment members are fastening screws; and wherein at a side of the shell body, the fastening screws are screwed in through the inside lining of the shell body through an opening which is closable by said cover member.

12. Motor vehicle body with a shell body having a body cutout for a rear door, and with a completely pre-mountable closing module having a rim, the module bearing the door; wherein the closing module closes the body cutout of the shell body; wherein the shell body has side members which run underneath the body cutout in a longitudinal direction of the shell body; wherein a lower frame runner of the rim of the closing module runs above the side members of the shell body; wherein a preassembled collision member which includes crash-boxes on both sides is attached to the lower frame runner of the rim; wherein the crash-boxes are connected directly to the side members; wherein a rear closure-reinforcing sheet is attached to the shell body underneath the body cutout and overlaps an end of the side members; and wherein the crash-boxes are attached to the side members with the rear closure-reinforcing sheet interposed therebetween.

13. Motor vehicle body with a shell body having a body cutout for a rear door, and with a completely pre-mountable closing module having a rim, the module bearing the rear door wherein the closing module closes the body cutout of the shell body; wherein the shell body has side members which run underneath the body cutout in a longitudinal direction of the shell body; wherein a lower frame runner of the rim of the closing module runs above the side members of the shell body; wherein a preassembled collision member which includes crash-boxes on both sides is attached to the lower frame runner of the rim; wherein the crash-boxes are connected directly to the side members; wherein the shell body ends above the side members with ends thereof exposed; wherein a rear closure section is extended downward and is attached to the lower frame runner of the rim; and wherein the crash-boxes are attached to the side members with the rear closure section interposed therebetween.

14. Motor vehicle body with a shell body having a body cutout for a rear door, and with a completely pre-mountable closing module having a rim, the module bearing the rear door; wherein the closing module closes the body cutout of the shell body; wherein the shell body has side members which run underneath the body cutout in a longitudinal direction of the shell body; wherein a lower frame runner of the rim of the closing module runs above the side members of the shell body; wherein a preassembled collision member which includes crash-boxes on both sides is attached to the lower frame runner of the rim; wherein the crash-boxes are connected directly to the side members; wherein fastening screws connect the crash-boxes to the side members of the shell body and are directed rearward in the longitudinal direction of the shell body.

15. Closing module for attachment to a shell body of a motor vehicle body, with a door, and a rim, the closing module having a door area which extends in a main plane; the closing module having bearing surfaces which extend roughly parallel to said main plane of the closing module, and which are engageable, in use, with bearing surfaces of a shell body of a vehicle to which the closing module is to be attached, in use, via mechanical attachment elements; wherein the rim of the closing module has attachment surfaces which extend roughly perpendicularly to said bearing surfaces and said main plane, and which are shaped to overlap corresponding attachment surfaces on the shell body, in use; and wherein the attachment surfaces on the rim are provided with insertion openings for the mechanical attachment elements.

16. Closing module as claimed in claim 15, wherein said attachment elements comprise fastening screws; wherein said door is a rear hatch which is connected at a top end thereof to an upper area of the rim by hinges; and wherein said fastening screws are located at least in an area at which said hinges are located, the upper area of the rim having insertion openings for the fastening screws in proximity to the hinges.

17. Closing module as claimed in claim 16, wherein the insertion openings are positioned in reinforcements which carry the hinges.

18. Closing module as claimed in claim 17, wherein the reinforcements are formed by a casting attached to the upper frame runner of the rim.

19. Closing module as claimed in claim 15, wherein said attachment elements comprise fastening screws; and wherein a lower area of the rim has insertion openings for the fastening screws.

20. Closing module as claimed in claim 15, wherein said attachment elements comprise fastening screws; and wherein left and right side area of the rim have insertion openings for the fastening screws.

21. Closing module for attachment to a shell body of a motor vehicle body, with a rear door, a rim and wherein the rim has a lower frame runner at a height which runs above side members of the shell body when the closing module is joined to the shell body; wherein a preassembled collision member includes crash-boxes on both sides and is attached to the lower frame runner of the rim; and wherein inner faces of the crash-boxes are provided for attaching the closing module to the side members of the shell body which are located underneath the lower frame runner.

22. Process for mounting a closing module on a shell body comprising the steps of:
   a) substantially completely preassembling a shell body with a body cutout for a door, said body cutout enclosing an open area defining a closure plane, before mounting the closing module including equipping the shell body with an inner roof lining and an inside lining;
   b) substantially completely preassembling a closing module having a door, a rim the closing module having a door area which extends in a main plane which is substantially parallel to said closure plane when the closing module is mounted closing the body cutout, before mounting the closing module on the shell body;
   c) placing the closing module on the body cutout of the shell body;
   d) attaching the closing module to the shell body and fixing it in the body cutout of the shell body with the door open, using a plurality of attachment elements in an upper area, in a lower area and on sides of the rim of the closing module, substantially all of said attachment elements being inserted in a direction from an interior side of said body cutout to an exterior side of said body cutout and perpendicular with reference to said main plane of the closing module.

23. Process for mounting a closing module on a shell body according to claim 22 wherein fastening screws are used as said attachment elements.

* * * * *